June 23, 1970　　　　　　　M L. COOK　　　　　　　3,516,190
FISHING ROD HOLDER

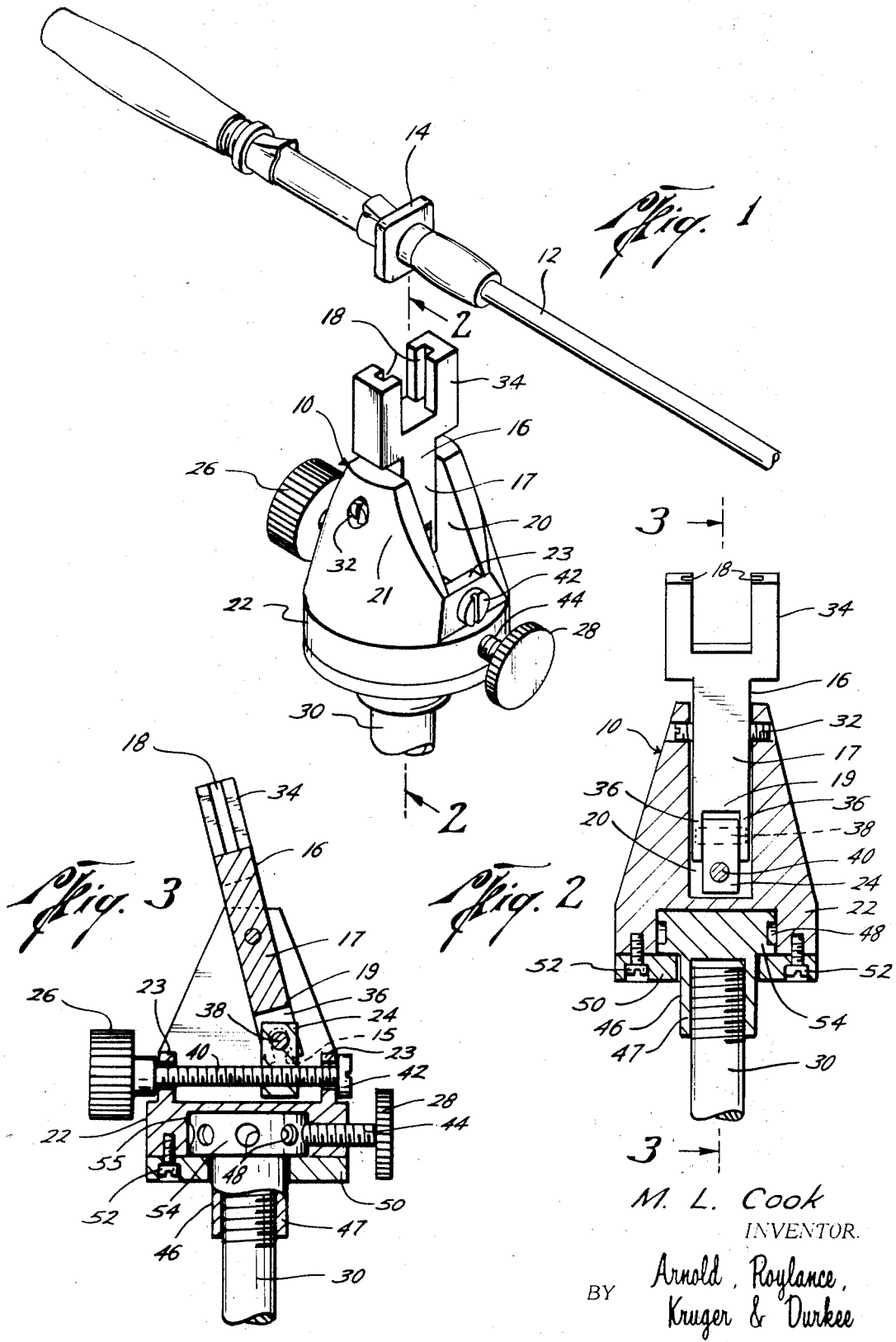

Filed April 3, 1968　　　　　　　　　　　　　　　　2 Sheets-Sheet 2

M. L. Cook
INVENTOR

BY Arnold, Roylance,
Kruger & Durkee
ATTORNEYS

United States Patent Office 3,516,190
Patented June 23, 1970

3,516,190
FISHING ROD HOLDER
M. L. Cook, P.O. Box 238, Friendswood, Tex. 77546
Filed Apr. 3, 1968, Ser. No. 718,562
Int. Cl. A01k 97/10
U.S. Cl. 43—21.2                    17 Claims

ABSTRACT OF THE DISCLOSURE

In one exemplar embodiment, a fishing rod holder for attachment to a suitable supporting fixture is provided with a body member rotatable with respect to the supporting fixture and a yoke pivotally disposed within the body member cooperating with a screw means for pivoting the yoke to a desired inclined position. An adapter attached to the fishing rod engages the yoke for supporting the rod in a desired inclined position.

BACKGROUND OF THE INVENTION

It is well known that the sport of catching fish is a popular pastime and is enjoyed by a considerable fraternity of fishermen. Such sport fishing accomplishes a wide variety of methods, i.e., fishing with a rod and reel or cane pole beside a lazy stream or lake, surf fishing or ocean fishing from a jetty or pier, or fishing from boats ranging from a small outboard motor boat to deep sea cruisers. As any fisherman can testify, there are often many "lazy" periods when the fishing activity is slack and the fish are not biting. However, because of the unpredictable imponderables of nature, such inactivity may suddenly cease and an extremely active period may follow during which the fish are biting, and the fisherman is active engaged in casting his bait and playing and retrieving fish. Often, during the lazy or slack periods when the fishing activity is slow, it is a common practice among fishermen to leave their lines baited and in the water, and to leave their fishing rods unattended for an indefinite period of time until the active fishing period commences. A fishing rod as hereinafter used will include all forms of fishing rods, cane poles and the like.

Often a fisherman will leave an unattended fishing rod simply lying on the ground, dock, pier or the seat of a boat while he tends to other matters. Often the unattended fishing rod will be propped up against a bush, a forked stick, a railing along a dock or pier, or the side of the boat allowing the fisherman to observe the line in the event that a fish takes the bait and to prevent the rod from being sududenly dragged into the water if a fish happens to strike the bait and set the hook.

Consequently, various means have been devised to hold the rod, such as embedding the handle or butt of the fishing rod in the earth, using a simple tubular bracket for retaining the rod or utilizing other more complicated devices to hold and support the fishing rod while it is unattended. It is desirable that the fishing rod be supported at various preselected inclined positions and pointed in a preselected direction to properly tension and distribute the fishing line in such a manner that the action of the line is readily observable by the fisherman. Further, the correct positioning of the rod will tend to negate or oppose forces acting on the fishing line such as the wind and water current.

Many devices have been used, however, most are cumbersome, and complicated, or they do not provide a means of selection of inclination angles for the rod or pole. In addition, it is desirable that existing fishing rods may be easily and conveniently modified for use with a fishing rod holder without having to resort to costly changes in the fishing rod design or in a costly modification process and will not interfere with normal casting and retrieving functions of the fishing equipment. Further, a fisherman desires that such a fishing rod holder will conveniently support the rod in any desired inclined position or lateral direction as desired by the fisherman, and yet will allow the fishing rod to be instantly removed from the holder for manipulation in retrieving and playing a fish that has been hooked.

SUMMARY OF THE INVENTION

The instant invention provides a novel fishing rod holder for overcoming the disadvantages of the prior art and accomplishing the sought after desirable features hereinbefore mentioned by utilizing a fishing rod holder having a body adapted for attachment to a suitable supporting fixture, an upwardly extending yoke attached to the body and adapted for arcuate movement with repect to the body, and an adapter suitable for attachment to a standard fishing rod at a single supporting position for engaging the yoke and supporting the rod in a predetermined position.

In one preferred form, the body member is rotatably attached to an upright supporting rod that may be suitably fixed in the earth, to a dock or pier, or to a boat. The body member has a transverse rectangular recess into which a yoke member having a U-shaped head is suitably disposed in an upright attitude leaving the head exposed above to allow the yoke head free arcuate movement in response to a screw actuated means for laterally moving the lower end of the yoke. An adapter for attachment to a standard fishing rod provides a means of attaching the rod to the pivotable yoke head for supporting the rod in a desired inclined position. A locking means is provided to lock the body member with respect to the support rod after rotation to a desired position.

Accordingly, it is a primary feature of the present invention to provide a fishing rod holder adaptable for use with all standard fishing rods and for use with straight poles.

Another feature of the present invention is that modification of conventional fishing rods and poles for adaptation to use with the fishing rod holder may be accomplished inexpensively and with a minimum of lost time.

Yet another feature of the present invention is that the fishing rod holder provides any desired rotational and inclination adjustment and movement of the rod when it is supported by the holder.

It is another feature of the present invention to provide a fishing rod holder that will securely grip a modified fishing rod while the rod is unattended, but allow the rod to be easily removed from the holder for use.

BRIEF DESCRIPTION OF THE DRAWINGS

In order that the manner in which the above-cited advantages and features of the invention are attained, as well as others which will become apparent, can be understood in detail, a more particular description of the invention may be had by reference to specific embodiments hereof which are illustrated in the appended drawings, which drawings form a part of the specification. It is to be noted, however, that the appended drawings illustrate only typical embodiments of the invention and therefore are not to be considered limiting of its scope for the invention may admit to other equally effective embodiments.

In the drawings:

FIG. 1 is a perspective view of a fishing rod holder adapted for supporting a modified fishing rod.

FIG. 2 is a detailed vertical cross-sectional view of the fishing rod holder according to this invention taken along lines 2—2 of FIG. 1.

FIG. 3 is a detailed vertical cross-sectional view of the fishing rod holder shown in FIG. 1 as taken along lines 3—3 of FIG. 2.

DESCRIPTION OF THE PREFERRED EMBODIMENTS

Figure 4:
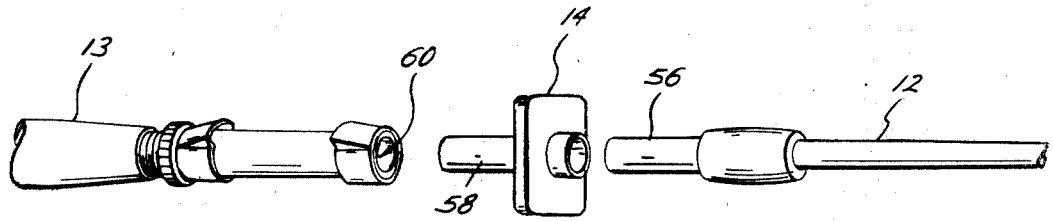
FIG. 4 is a pictorial view showing a conventional fishing rod disassembled for modification to accept a flanged adapter for engagement by the holder as shown in FIG. 1.

Referring now to the drawings and particularly to FIG. 1, a perspective view of a fishing rod holder 10 according to the present invention is shown for supporting a fishing rod 12 modified to have a flanged adapter 14 attached thereto. Fishing rod holder 10 comprises a cylindrical body member 22 having inwardly and upwardly slanting sides 21 of a generally truncated triangular configuration with a slotted recess 20 separating the two upwardly extending sides 21. Movable yoke member 16 has a U-shaped yoke head 34 and a yoke stem 17, the latter disposed in the slotted space 20 between ends 21 of the body 22. U-shaped yoke head 34 has inwardly facing slots 18 in the inner surface of the arms of the U-shaped head 34 for accepting flanged member 14 in order to hold fishing rod 12 at a single supporting position securely in yoke 16.

Yoke 16 pivots within recess 20 between extending sides 21 about pivot pin 32. Body 22 rotates in a plane perpendicular to support rod 30 and provides complete 360° rotation of the holder 10 with respect to support rod 30. The rotational position of body 22 may be fixed in any desired relationship to support rod 30 by means of a rotation clamping screw 44 actuated by turning knob 28. Yoke 16 is pivotable about pin 32 to move head 34 arcuately through a vertical plane by means of a threaded screw as will be hereinafter described. Knob 26 is attached to an end of the screw and provides a convenient means of turning the screw for positioning yoke 16 as will be hereinafter described.

The construction and operation of the fishing rod holder 10 may best be seen by reference to FIGS. 2 and 3, vertical cross-sectional views of holder 10 taken along lines 2—2 of FIG. 1 and lines 3—3 of FIG. 2. One end of yoke stem 17 has a U-shaped head 34 and the other end has a forked end 19 with two spaced-apart extending arms 36. The body 22 of holder 10 has two upwardly extending side members 21 separated by a rectangular recess 20 transversely through body 22. Yoke stem 17 is pivotally disposed within recess 20 by means of pivot pin 32 inserted transversely through side members 21. Perpendicular to the inner surfaces of and positioned at opposite ends of the bases of the truncated triangular shaped side members 21 are flanged sections 23 integrally connecting the ends of the bases of the side members 21 and the cylindrical portion of body 22 for providing two upwardly spaced-apart flange sections.

A rectangular block 24 having a threaded aperture transverse to its longitudinal axis is disposed within recess 20. A screw 40 is disposed through spaced-apart flange sections 23 and the threaded aperture of block 24. Screw head 42 and knob 26, attached to the other end of screw 40 protruding through flanged section 23, retain screw 40 within body 22. Knob 26 provides a convenient means for rotating the screw 40 for purposes to be hereinafter described. The extending arms 36 of forked end 19 of yoke stem 17 straddle traveling block 24 and are pivotally engaged thereby by means of a slot 15 in each of the extending arms 36 that engage a cross pin 38 disposed transversely through traveling block 24 perpendicular to the longitudinal axis of screw 40.

The base of the circular body 22 has a cylindrical cavity 55 for accepting the circular flanged head 54 of a bearing member 46 having a depending cylindrical member 47 that is threadably attached to a supporting rod 30. A circular base plate 50 having a central aperture is attached to the base of body 22 in a conventional manner by the use of screws 52 to close cavity 55 and engage and retain flanged head 54 within the closed cavity 55. The outer periphery of flanged head 54 has an annular row of evenly spaced outwardly opening recesses 48 for providing a series of predetermined positions through which the holder 10 may be rotated. Locking screw 44, disposed radially in the side of the base portion of body 22 and turned by knob 28, is aligned with the centers of the recesses 48 and engageable therewith to lock body 22 in any of the predetermined rotated positions indicated by the recesses 48.

As knob 26 is rotated, thus rotating screw 40, traveling block 24 moves laterally along the screw 40 and causes the forked end 19 of yoke stem 17 to follow the lateral movement of the traveling block 24. As block 24 traverses the screw 40, the forked end 19 engages cross-pin 38 with slots 15 causing yoke stem 17 to pivot about pin 32. Lateral movement of forked end 19 of yoke stem 17 causes the yoke head 34 to move arcuately in the opposite direction. In this manner, the position of yoke head 34 may be tilted forwardly or rearwardly through a predetermined arc corresponding to the total lateral travel permitted traveling block 24 between the inner surfaces of flanged sections 23 along screw 40. As yoke head 34 is tilted, the angle at which the rod 12, see FIG. 1, may be tilted as it is supported by holder 10 may be varied to a desired angle at the option of the fisherman. The entire holder 10 may be rotated in a plane transverse to the axis of rod 30 to any one of a series of predetermined positions simply by turning knob 28 to disengage the tip of screw 44 from recesses 48 and turning the holder body 22 until the rod has been rotated to the desired position. Knob 28 is again rotated to drive the tip of screw 44 into the recess 48 nearest the position selected for the rod.

Support rod 30 may be a tubular or solid rod suitably attached to the bearing member 46. If the support rod 30 is to be a permanent fixture, it may be threadably attached to the cap 46 as shown in FIGS. 2 and 3. However, in other applications, it may be desirable that support rod 30 and member 46 are integral members to provide a means for removing the holder and the rod simultaneously. Support rod 30 may be adapted to conveniently fit a bracket attached to the gunwale of a boat, very much in the same fashion as an oar lock fits an oar lock bracket, or a suitable mounting bracket or stand may be provided in the deck or floor of a boat or on any other fixed surface such as a marina or dock. The other end of the support rod 30 may be provided with a spike and merely driven into the ground adjacent the water's edge to provide a convenient transportable means of utilizing the fishing rod holder 10 while the fisherman is fishing along a river bank, lake shore or seashore.

Figure 5:
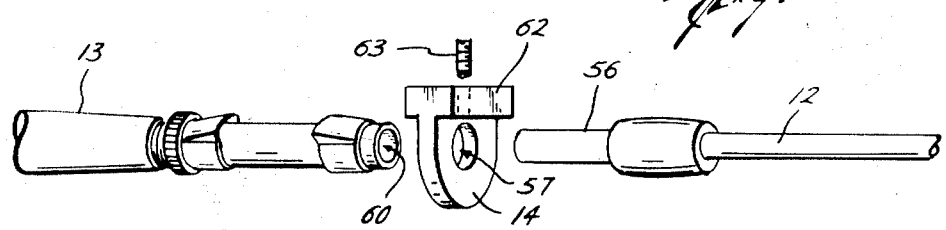
FIG. 5 is a pictorial view of a conventional fishing rod shown disassembled for modification to accept another embodiment of the flanged adapter for engagement by the fishing rod holder shown in FIG. 1.

The modification of an existing fishing rod 12 to accommodate the flanged adapter 14 is shown in FIGS. 4 and 5. Referring to FIG. 4 a flange member 14 is shown encircling a tubular member 58 of a suitable inner diameter to fit a standard size base ferrule 56 of conventional fishing rod 12. In some cases the ferrule 56 will be adequately retained within tubular body 58 by frictional forces, however, a bonding agent such as epoxy cement may be used to insure that ferrule 56 remains fixed within tubular body 58 in the desired position. Tubular body 58 has an outer diameter adapted for insertion within the ferrule aperture 60 of the handle portion 13 of conventional fishing rods. The fit of body 58 within aperture 60 is ideally of a close tolerance to insure frictional engagement of tubular body 58 by handle 13. However, it is possible that the user may wish to permanently fix tubular body 58 within aperture 60 of rod handle 13 by using a bonding agent or solder for a permanent joinder of the parts.

In FIG. 5, another embodiment of the flanged adapter 14 is shown. A semicircular flanged member 14 having a laterally extending head portion 62, of a greater thickness than the flanged portion 14, is adapted for slidable insertion over the end of the tubular base ferrule 56 of a conventional rod 12 by inserting the ferrule 56 through an aperture 57 centrally located in the semicircular flanged member 14. Ferrule 56 would then be inserted into ferrule aperture 60 of the fishing rod handle 13 in a conventional manner. Set screw 63 is disposed through head 62 and communicates with aperture 57 to contact ferrule 56 for locking flange 14 in a preselected orientation with respect to the fishing rod 12. Of course, flanged members 14, as shown in FIGS. 4 and 5, may be left in place on the fishing rod 12 while the rod is used by a fisherman and the fishing rod holder 10 is not employed. In this manner, the fishing rod would be instantly adaptable to use with the fishing rod holder 10 at the fisherman's option.

Figure 6:
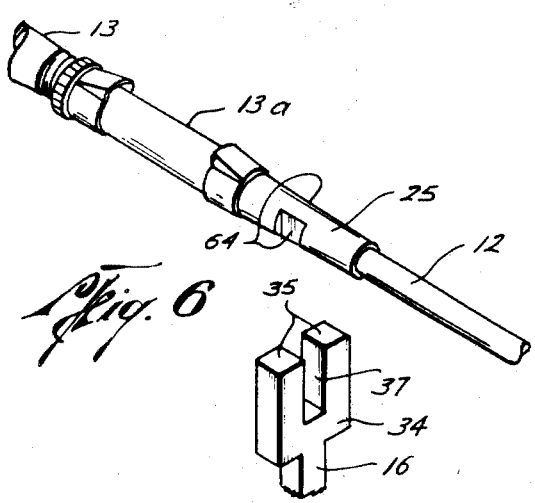
FIG. 6 is a pictorial view showing another embodiment of the head section of the yoke member of the fishing rod holder shown in FIG. 1, and its means of engagement with the fishing rod.

In FIG. 6, another embodiment of the U-shaped head 34 of movable yoke 16 is shown. In this embodiment, the head 34 has a U-shaped configuration having two upwardly extending arms 35 of rectangular cross-section with a rectangular slot 37 therebetween. A conventional fishing rod 12 may be modified to provide parallel spaced-apart notches 64 on either side of the rod gripping member 25 just forward of the reel seat 13A. Modified fishing rod 12 would be lowered to engage the extending arms 35 of head 34 in the notches 64 to support fishing rod 12 as hereinbefore described. This modification may be used with conventional fishing rods 12 that are not designed for disassembly and have a gripping member 25 constructed of metal or other extremely hard durable material.

Figure 7:
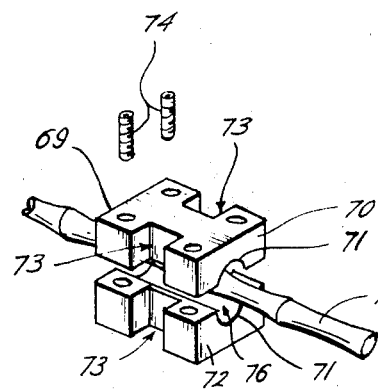
FIG. 7 is a pictorial view of an adapter that may be utilized to adapt fishing rods or poles for use with the fishing hod holder shown in FIG. 6.

Ordinary "cane" fishing poles or other rods may be adapted for use with the fishing rod holder 10 as shown in FIG. 1, by use of the adapter 69 shown in FIG. 7. Adapter 69 comprises a pair of H-shaped adapter sections 70 and 72, each having a longitudinal semicircular channel 71 in one face. The upper and lower halves, 70 and 72 respectively, of adapter 69 when fitted together provide an annular space 76 for accepting and retaining a fishing rod 11. Screws 74 are provided for conventionally attaching the upper and lower halves, 70 and 72 respectively, of the adapter 69 together to form a unitary member. Adapter 69 has aligned slots 73 that are perpendicular to the longitudinal axis of the annular aperture 76 to provide the necessary slots for engaging extending arms 35 of the embodiment of the yoke head 34 as shown in FIG. 6. Of course, adapter halves 70 and 72 respectively may have an extending flanged surface suitable for engaging slots 18 of head 34 as shown in FIGS. 1, 2 and 3.

By using adapter 69, any cylindrical fishing rod may be adapted for use with fishing rod holder 10 by using an appropriate yoke head 34. The adapter 69 may be made with the semicircular channel 71 in several varying radii to accommodate rods or poles of various diameters. If the diameter of the annular space 76 is too large, and the adapter will not frictionally engage the surface of the rod or pole 11 to maintain the adapter in a fixed position, suitable shims may be inserted into the semicircular channels 71 to build up the diameter of the rod or pole 11 for use with adapter 69. Of course, if the diameter of aperture 76 is too small to accommodate a rod or pole 11, adapter sections 70 and 72 may be clamped to the rod or pole 11 with a space separating the sections. Screws 74 are of sufficient length to accomplish such an attachment.

Figure 8:
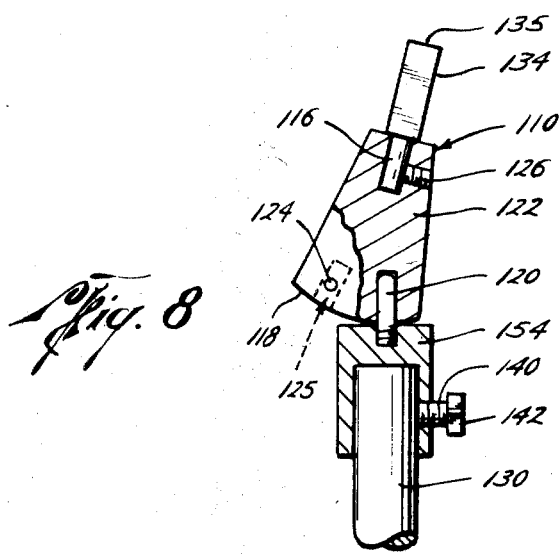
FIG. 8 is a side elevational view, partly in cross section, of another embodiment of the fishing rod holder according to the present invention.

In FIG. 8, another embodiment of the fishing rod holder according to the present invention is shown. Fishing rod holder 110 comprises a yoke head 134, a yoke body 122, and a cap 154 rotatably attached to a support rod 130. Yoke body 122 has a truncated wedge shape, the wider end 118 having an arcuate configuration. Apertures 125 are drilled radially into body 122 and communicate with the outer rim of arcuate shaped end 118. Cap 154 is insertable over and freely rotatable about the end of rod 130. A screw 140 with a knob 142 provides a means of locking cap 154 in any desired rotational position in relation to rod 130.

A pin or rod 120 is threadably attached to the center of cap 154 and projects upwardly in axial alignment with cylindrical cap 154 and rod 130. Rod 120 is insertable in one of the drilled apertures 125 in body 122 to provide a means of positioning body 122 in one of the several selected positions, i.e., one of the several apertures 125 as previously mentioned. A set screw 124 provides a conventional means of locking yoke body 122 to rod 120.

Yoke 134 has a head 135 and a projecting shaft 116 insertable into an aperture in the truncated end of the wedge shaped body section 122. Set screw 126 is adapted for conventionally retaining shaft 116 within yoke body 122 and locking head 134 and body 122 together as a rigid member.

It may be seen that yoke head 134 may take the form of either of the embodiments hereinbefore discussed, and the yoke head 134 may conveniently be rotated to various positions with respect to yoke body 122 by simply loosening set screw 126 and turning yoke 134 about its shaft 116 to a desired position and then retightening set screw 126. Similarly, yoke body 122 may be positioned with respect to cap 154 by loosening set screw 124, repositioning the body 122 by inserting pin 120 into another aperture 125 or rotating body 122 with respect to cap 154 and then retightening the set screw 124. However, this last mentioned means of repositioning body 122 by rotation with respect to cap 154 about pin 120 is somewhat cumbersome and slower than utilizing the retaining screw 140 built into cylindrical cap 154 which allows cap 154, yoke body 122 and yoke head 134 as a unit to be rotated to any desired position in relation to supporting rod 130.

Of course, rod 130 may be adapted for attachment to the gunwale of a boat, to a specially prepared bracket mounted in the deck or bottom of a boat, or a dock, or other suitable surface, or rod 130 may simply have a pointed end for being inserted into the ground adjacent the body of water being fished as hereinbefore described.

The flanged adapter 14 as shown herein as a modification to existing fishing rods may, however, just as easily be included in newly manufactured rods to adapt them for use with the fishing rod holder 10 hereinbefore described. The flexibility of the holder 10, of course, is not limited by the several yoke or adapter embodiments shown herein, but may receive any yoke 16 having a desired yoke head 34 merely by removing pivot pin 32 and replacing the yoke currently used with another having another adapter fitting. In this way, a fisherman could use any number of different types of rods with differing adapter fittings 14 with one basic rod holder 10 by merely interchanging the yokes 16.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:
1. In a fishing rod holder adapted for attachment to a suitable supporting fixture, the combination comprising
   a body member adapted for attachment to the supporting fixture and being rotatable with respect thereto, said body member including a pair of up- wardly extending sides having a transverse slotted opening therebetween, a yoke member having a stem portion disposed between said upwardly extending sides of said body member and mounted for arcuate movement in said transverse slotted opening, said yoke member having a head section adapted for engaging the fishing rod at a single supporting position, a screw disposed transversely in the lower portion of said slotted opening and mounted for rotation, a traveling block mounted on said screw and adapted for lateral movement in response to rotation of said screw, and connecting means for pivotally attaching said traveling block to the lower end of said yoke stem for arcuately moving said yoke member in response to rotation of said screw and movement of said traveling block.

2. The fishing rod holder as described in claim 1, wherein said yoke member includes a U-shaped head section having a pair of upwardly extending arms for engaging a pair of slots disposed laterally on opposite sides of the forward portion of the fishing rod handle.

3. The fishing rod holder described in claim 1, including an adapter member suitable for attachment to the fishing rod for engaging the head section of said yoke member and supporting the rod.

4. The fishing rod holder as described in claim 3, wherein said adapter member comprises
- a tubular section one end portion of which is adapted for acceptance of the base ferrule of a fishing rod and the other end portion of which is adapted for insertion into the ferrule aperture in the handle of the fishing rod for joining said rod and said handle into one unit, and
- a flange laterally extending from the outer periphery of said tubular section for slidable engagement with the head section of said yoke member.

5. The fishing rod holder as described in claim 4, wherein said head section of said yoke member has a U-shaped configuration having a pair of upwardly extending arms and inwardly facing slots longitudinally along the inner surfaces of said extending arms for engaging said laterally extending flange of said adapter member.

6. The fishing rod holder as described in claim 3, wherein said adapter member comprises
- a flat rectangular metal flange section having a circular aperture centrally therethrough for being insertable over the base ferrule of the fishing rod to provide a flanged surface extending laterally from the outer periphery of said rod and engaging the head section of said yoke member, and
- a set screw disposed radially through said flanged section and communicating with said aperture to provide a means for locking said flange section in place with respect to the fishing rod.

7. The fishing rod holder as described in claim 6, wherein said head section of said yoke member has a U-shaped configuration having a pair of upwardly extending arms and inwardly facing slots longitudinally along the inner surfaces of said extending arms for engaging said flat rectangular metal flange section.

8. The fishing rod holder as described in claim 1, wherein said body member includes
- a base section having a cylindrical recess,
- a bearing member adapted for attachment to the support fixture and having a circular flanged head the other peripheral surface of which contains an annular row of outwardly opening recesses, the flanged head being rotatably disposed within said cylindrical recess,
- a base plate having a central circular aperture therethrough for insertion over the outer surface of said bearing member and adapted for attachment to the bottom of said base section for retaining said flanged head within said recess but allowing said base section and base plate to rotate with respect to said bearing member, and
- a locking screw radially disposed through the side of said base section for engaging one of said outwardly opening recesses disposed around said flanged head and locking said base section in any desired rotational position with respect to said bearing member.

9. A fishing rod holder, comprising
- a support rod adapted for providing an upright rigid mounting support for the holder,
- a body member adapted for attachment to the upper end of said support rod and being rotatable with respect thereto, said body member including a pair of upwardly extending sides having a transverse slotted opening therebetween, and a pair of spaced-apart upright flanges disposed transversely within said slotted opening adjacent the interior surfaces of said extending arms to define a discrete recess therebetween,
- a yoke member disposed within said transverse slotted opening of said body member and adapted for arcuate movement with respect to said body member to a plurality of inclined positions, said yoke member including
  - a U-shaped head section having a pair of upwardly extending arms, and
  - a stem section extending downwardly from said head section and mounted in said transverse slotted opening for pivotal movement therein between said upwardly extending sides of said body member,
- means cooperating with said yoke stem for positioning said yoke member to a desired inclined position, and
- an adapter member suitable for attachment to a single supporting point of a fishing rod for engaging said pair of upwardly extending arms of said yoke member and supporting the rod in a selected position.

10. The fishing rod holder as described in claim 9, wherein the lower end of said yoke stem section includes a forked section extending from the lower end of said stem section for providing a pair of spaced apart downwardly extending arms for cooperating with said means for positioning said yoke member to a desired inclined position.

11. The fishing rod holder as described in claim 10, wherein said means for positioning said yoke member to a desired inclined position comprises
- an elongated screw disposed transversely in said discrete recess between said spaced-apart upright flanges and mounted for rotation,
- a traveling block mounted for lateral movement along said screw in response to rotation of said screw and adapted for insertion between the downwardly extending arms of the forked end section of said yoke member, and
- a cross-pin disposed transversely through said traveling block for pivotally engaging apertures in the downwardly extending arms of the forked section of said yoke member straddling said traveling block and causing arcuate pivotal movement of said yoke member in response to said lateral movement of said traveling block.

12. The fishing rod holder as described in claim 11, wherein said body member includes
- a base section having a cylindrical recess,
- a bearing member having a circular flanged head the outer peripheral surface of which contains an annular row of outwardly opening recesses, said flanged head being rotatably disposed within said cylindrical recess, and a depending tubular section internally threaded to engage the upper threaded end of said support rod, a base plate having a central circular aperture therethrough for insertion over the outer surface of said tubular section and adapted for attachment to the bottom of said base section for retaining said flanged head within said recess but allowing said base section and base plate to rotate with respect to said bearing member, and a locking screw radially disposed through the side of said base section for engaging one of said outwardly opening recesses disposed around said flanged head and locking said base section in any desired rotational position with respect to said bearing member.

13. The fishing rod holder described in claim 11, wherein the U-shaped head section of said yoke member has inwardly facing slots longitudinally along the inner surfaces of said extending arms for engaging said adapter member.

14. The fishing rod holder as described in claim 13, wherein said adapter member comprises a tubular section, one end portion of which is adapted for acceptance of the base ferrule of a fishing rod and the other end portion of which is adapted for insertion into the ferrule aperture in the handle of the fishing rod for joining said rod and said handle into one unit, and a flange laterally extending from the outer periphery of said tubular section for slidably insertion into said slotted arms of said U-shaped yoke head.

15. The fishing rod holder described in claim 13, wherein said adapter member comprises a flat rectangular metal flange section having a circular aperture centrally therethrough for insertion over the base ferrule of a fishing rod to provide a flanged surface extending laterally from the outer periphery of said rod and slidably insertable into said slotted arms of said U-shaped yoke head, and a set screw disposed radially through said flange section and communicating with said aperture to provide a locking means for preventing rotation of said flange section with respect to the fishing rod.

16. The fishing rod holder as described in claim 10, wherein said U-shaped head section of said yoke member engages a pair of slots laterally disposed on opposite sides of a forward portion of the fishing rod handle.

17. The fishing rod holder as described in claim 16, wherein said adapter member comprises a pair of H-shaped sections having a semi-circular channel disposed transversely in one surface, said sections adapted for attachment one to the other with said surfaces having said channel in facing complementary relationship for aligning said semicircular channels and the slots of each of said H-shaped sections, and means for attaching said aligned complementary H-shaped sections together for forming an annular aperture for accepting the fishing rod and clamping said H-shaped sections to opposite sides of the rod for providing aligned slots engageable with said extending arms of said U-shaped yoke head section.

References Cited

UNITED STATES PATENTS

| | | | |
|---|---|---|---|
| 2,311,823 | 2/1943 | Gaskill | 43—21.2 |
| 2,484,427 | 10/1949 | Schwenk | 248—42 |
| 2,553,231 | 5/1951 | Bayto | 248—42 |
| 2,693,660 | 11/1954 | Nebergall et al. | 43—21.2 |

WARNER H. CAMP, Primary Examiner

PO-1050
(5/69)

UNITED STATES PATENT OFFICE
CERTIFICATE OF CORRECTION

Patent No. 3,516,190             Dated June 23, 1970

Inventor(s)   M.L. Cook

It is certified that error appears in the above-identified patent and that said Letters Patent are hereby corrected as shown below:

Col. 1, line 50, "sududenly" should read -- suddenly --; col. 3, line 14, "hod" should read -- rod --; col. 3, line 65, before "spaced-apart" the word -- extending -- should be inserted.

SIGNED AND
SEALED
FEB 2 1974

(SEAL)
Attest:
Edward M. Fletcher, Jr.
Attesting Officer

WILLIAM E. SCHUYLER, JR.
Commissioner of Patents